(12) United States Patent
Racape et al.

(10) Patent No.: US 12,101,472 B2
(45) Date of Patent: Sep. 24, 2024

(54) INTRA PREDICTION MODE PARTITIONING

(71) Applicant: INTERDIGITAL VC HOLDINGS, INC., Wilmington, DE (US)

(72) Inventors: Fabien Racape, San Francisco, CA (US); Gagan Rath, Bhubaneswar (IN); Fabrice Urban, Thorigne Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 241 days.

(21) Appl. No.: 17/438,041

(22) PCT Filed: Mar. 10, 2020

(86) PCT No.: PCT/US2020/021788
§ 371 (c)(1),
(2) Date: Sep. 10, 2021

(87) PCT Pub. No.: WO2020/185723
PCT Pub. Date: Sep. 17, 2020

(65) Prior Publication Data
US 2022/0150485 A1    May 12, 2022

(30) Foreign Application Priority Data
Mar. 11, 2019 (EP) .................................... 19305287

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/119* (2014.11);
(Continued)

(58) Field of Classification Search
CPC .............................. H04N 19/11; H04N 19/96
See application file for complete search history.

(56) References Cited

U.S. PATENT DOCUMENTS

2013/0301718 A1    11/2013    Amon
2016/0073107 A1    3/2016    Moon et al.
(Continued)

FOREIGN PATENT DOCUMENTS

WO    2019004888    1/2019
WO    WO-2020232355 A1 *   11/2020   ............. H04N 19/11

OTHER PUBLICATIONS

JVET Document J0014 (Apr. 2018) (Year: 2018).*
(Continued)

*Primary Examiner* — David N Werner
(74) *Attorney, Agent, or Firm* — Ronald Kolczynski

(57) ABSTRACT

A method and apparatus for performing intra prediction mode partitioning predicts pixels of a video coding block using a plurality of intra prediction modes over a plurality of regions of the video coding block. Predictions can be based on reference arrays using at least one reference line above the block to be coded and/or using at least one reference column to the left of the block to be coded. Different prediction modes are used in different regions of the coding block. In at least one embodiment, the video coding block is split into a plurality of partitions in addition to having a plurality of intra prediction modes over different regions of the block. Signaling enables a decoder to determine the number of regions within a coding block. In at least another embodiment, prediction modes allowable within regions of a video coding block differ by one angular position.

17 Claims, 16 Drawing Sheets

(51) Int. Cl.

| | |
|---|---|
| *H04N 19/119* | (2014.01) |
| *H04N 19/159* | (2014.01) |
| *H04N 19/17* | (2014.01) |
| *H04N 19/176* | (2014.01) |
| *H04N 19/593* | (2014.01) |
| *H04N 19/70* | (2014.01) |
| *H04N 19/96* | (2014.01) |

(52) U.S. Cl.
CPC ........... *H04N 19/159* (2014.11); *H04N 19/17* (2014.11); *H04N 19/176* (2014.11); *H04N 19/593* (2014.11); *H04N 19/70* (2014.11); *H04N 19/96* (2014.11)

(56) References Cited

U.S. PATENT DOCUMENTS

| | | | |
|---|---|---|---|
| 2017/0353721 A1* | 12/2017 | Piao | H04N 19/147 |
| 2018/0098097 A1* | 4/2018 | Huang | H04N 19/70 |
| 2019/0387226 A1* | 12/2019 | Lee | H04N 19/119 |
| 2020/0413075 A1* | 12/2020 | Li | H04N 19/119 |
| 2021/0250576 A1* | 8/2021 | Kim | H04N 19/182 |
| 2021/0377564 A1* | 12/2021 | Filippov | H04N 19/11 |
| 2022/0021892 A1* | 1/2022 | Zhou | H04N 19/11 |
| 2022/0086439 A1* | 3/2022 | Tsai | H04N 19/11 |

OTHER PUBLICATIONS

JVET Document K0049 (Jul. 2018) (Year: 2018).*
JVET Document J1023 (Apr. 2018) (Year: 2018).*
Fernandes et al., Efficient HEVC Intra-Frame Prediction Using Curved Angular Modes, Electronics Letters, IEE Stevenage, GB, vol. 54, No. 21,Oct. 18, 2018 (Oct. 18, 2018), pp. 1214-1216.
Gang et al., The Intra Prediction Based on Sub Block, Signal Processing, 2004. Proceedings. ICSP '04. 2004 7th International Conference on Beijing, China Aug. 31-Sep. 4, 2004, vol. 1, Aug. 31, 2004 (Aug. 31, 2004), pp. 467-469.
De Luxan Hernandez et al., CE3: Intra Sub-Partitions Coding Mode (Tests 1.1.1 and 1.1.2), Joint Video Experts Team (JVET) of ITU-T SG 16 WP 3 and ISO/IEC JTC 1/SC 29/WG 11. 13th meeting: Marrakech, CN, Jan. 9-18, 2019, Document: JVET-M0102-v1.
De Luxan Hernandez et al., CE3: Line-Based Intra Coding Mode (Tests 2.1.1 and 2.1.2), 12. JVET Meeting, Oct. 3, 2018-Oct. 12, 2018, Macao, Joint Video Experts Team (JVET) of ITU-T SG 16 WP 3 and ISO/IEC JTC 1/SC 29/WG 11), No. JVET-L0076-v2,.
Rivaz et al., Bitstream & Decoding Process Specification, 2018, The Alliance for Open Media, pp. 1-681.
Van Der Auwera, et al., Description of Core Experiment 3: Intra Prediction and Mode Coding, Joint Video Experts Team (JVET) of ITU-T SG 16 WP 3 and ISO/IEC JTC 1/SC 29/WG 11, Document: JVET-K1023-v3, 11th Meeting, Ljubljana, Slovenia, Jul. 10, 2018, 35 pages.

* cited by examiner (i) Horizontal Split in Half (ii) Vertical Split in Half

INTRA PREDICTION MODE PARTITIONING

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

Drawbacks and disadvantages of the prior art may be addressed by the general aspects described herein, which are directed intra prediction mode partitioning in encoding and decoding.

According to a first aspect, there is provided a method for encoding a block of video data. The method comprises steps for predicting pixels in a plurality of regions of a block of video data with intra prediction, wherein respective regions use different intra prediction modes; and, encoding said plurality of regions using said predictions.

According to a second aspect, there is provided a method for encoding a block of video data. The method comprises steps for predicting pixels in a plurality of regions of a block of video data with intra prediction, wherein respective regions use different intra prediction modes; and, encoding said plurality of regions using said predictions. According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
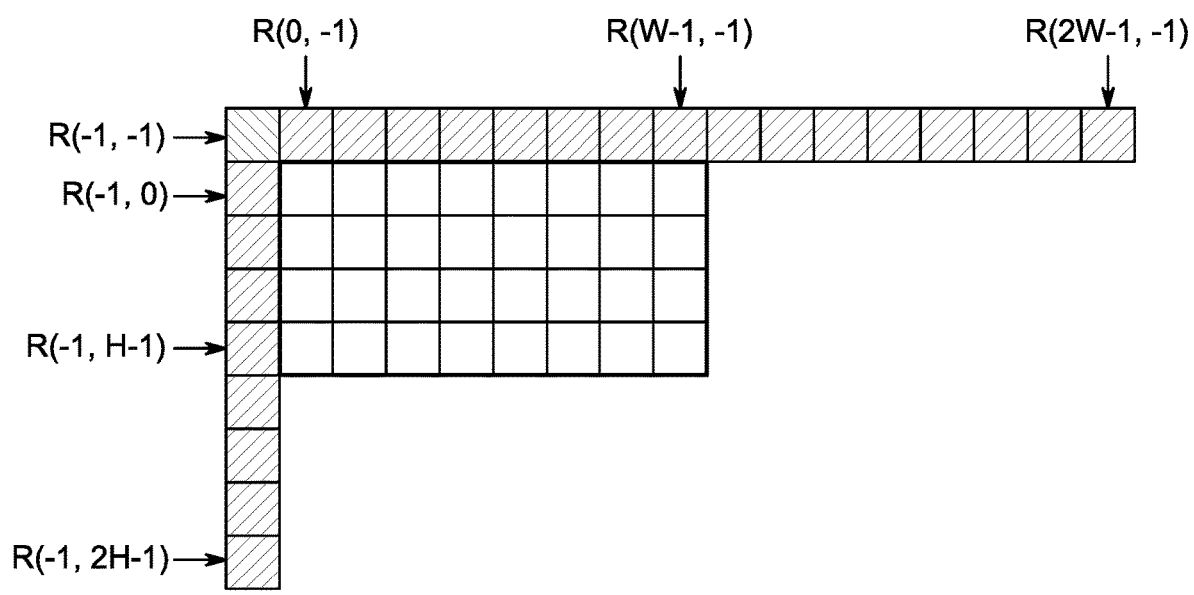
FIG. 1 shows reference samples for intra prediction in VTM.

The embodiments described here are in the field of video compression and relate to video compression and video encoding and decoding. In the Versatile Video coding (VVC) test model (VTM), any target block in intra prediction can have one of 67 prediction modes. Like HEVC, one is a PLANAR mode, one is a DC mode, and the remaining 65 are directional modes. The 65 directional modes are chosen from 95 directions, which include the 65 regular angles spanning from 45 degree to −135 degree if the target block is square, and potentially 28 wide angular directions when the block is rectangular. VTM encodes the prediction mode of a block using the Most Probable Mode (MPM) set, which consists of 6 prediction modes. If the prediction mode does not belong to the MPM set, it is truncated-binary encoded with 5 or 6 bits.

Past video coding standards such as H.264/AVC, HEVC, etc., and the forth-coming Versatile Video coding (VVC) all employ intra prediction where the prediction direction in a coding block remains the same throughout the block. The underlying idea is that the object directionalities remain unchanged over the coding block. This is a simplistic model as the object directionalities in natural imagery can change. Using a single prediction direction over a coding block leads to smaller coding blocks after rate-distortion (RD) optimization, which finds the best trade-off between a higher block size and less accurate prediction model, and smaller block size with higher number of side information for encoding the partitioning into smaller blocks.

A better idea is to use multiple prediction directions over the same coding block, where the directions are close to a principal direction and the directions are applied over different partitions. This will allow change of prediction direction inside a coding block in a structured manner so that the directions match more closely to the real-world imagery. This invention proposes several methods to explore this idea and presents results in the context of the current VVC coding test model (VTM).

Intra prediction is a core coding tool in all video compression standards such as H.264/AVC, HEVC, and VVC. The basic idea is to exploit the spatial correlation in a frame of an image sequence by predicting a block of pixels based on already decoded causal neighbor blocks. The prediction residual at the encoder is subsequently transformed with a block transform, the transform coefficients are quantized and then binary encoded. At the decoder, the block is reconstructed by adding the prediction to the decoded residual, which results from the inverse process of binary decoding, de-quantization, and inverse transform.

For prediction purposes, the standards define several models known as prediction modes. HEVC, for example, defines 35 prediction modes where one is a PLANAR mode, one is a DC mode, and the remaining 33 are angular modes. The PLANAR and DC modes aim to model slow and gradually changing intensity regions whereas the angular modes aim to model different object directionalities. VVC, on the other hand, defines 67 regular intra prediction modes, which include the 35 prediction modes from HEVC and an additional 32 angular modes. VVC also defines 28 wide angular modes to be used with rectangular coding blocks. The encoder prediction tool selects the best prediction mode in the sense of rate-distortion performance and signals it to the decoder using a mode coding scheme. The decoder prediction tool decodes the prediction mode and predicts the current block with this mode using the decoded pixels from neighbor blocks.

The usual process of intra prediction consists of first constructing two reference arrays, one on the left and the other on top, of the current block, using the decoded samples from the neighbor blocks. For any directional mode, the reference samples on top and/or left reference array are repeated along the associated direction inside the current block. Here the underlying assumption is that the directionalities of objects remain linear throughout the block and the intensity values do not change much along those directions. This model seems to work well, especially when the block sizes are small. When the blocks are large, as permitted by VVC, the directionality can gradually change. The general aspects described here present a simple method to model this phenomenon. Before presenting the method, a first brief description of the intra prediction in VVC Test Model VTM is given. For easier reference, the terms "CU" (Coding Unit) and "block" are used interchangeably throughout the text.

The intra prediction process in VTM consists of three steps: (1) reference sample generation (2) intra sample prediction and (3) post-processing of predicted samples. The reference sample generation process is illustrated in FIG. 1, which shows reference samples for intra prediction in VTM. The reference pixel values at co-ordinates (x,y) are indicated in the figure by R(x,y). H and W represent the height and width of the current block, respectively. For a CU of size H×W, a row of 2W decoded samples on the top is formed from the previously reconstructed top and top right pixels to the current CU. Similarly, a column of 2H samples on the left is formed from the reconstructed left and below left pixels. The corner pixel at the top-left position is also used to fill up the gap between the top row and the left column references. If some of the samples on top or left are not available, because of the corresponding CUs not being in the same slice, or the current CU being at a frame boundary, for example, then a method called reference sample substitution can be performed where the missing samples are copied from the available samples in a clock-wise direction. Then, depending on the current CU size and the prediction mode, the reference samples can be filtered using the low-pass filter with coefficients [¼, ½, ¼], which is applied vertically on the left reference column and horizontally on the top reference row.

Figure 2:
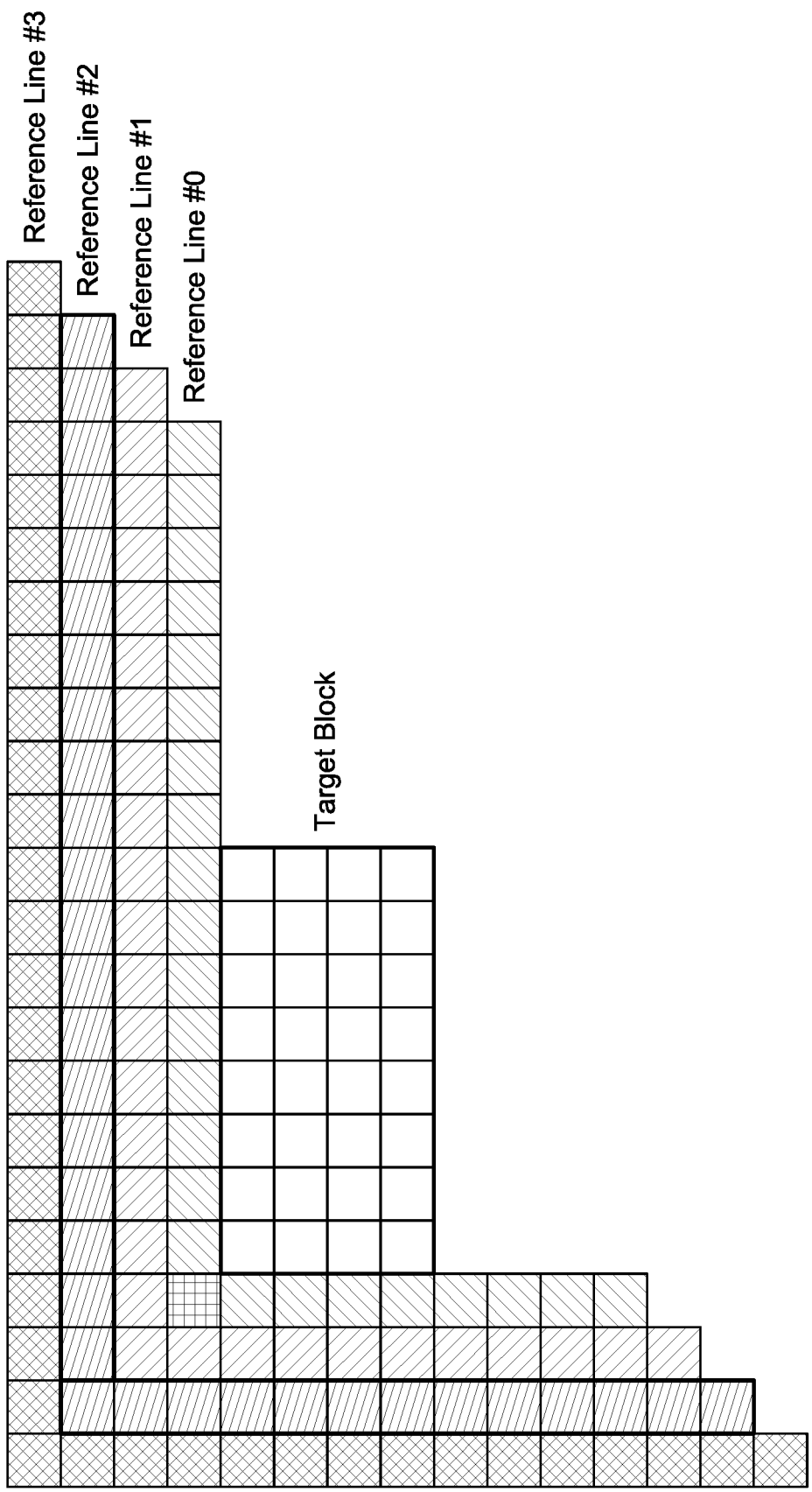
FIG. 2 shows multiple reference lines for intra prediction in VIM.

VTM 4.0. also supports intra prediction with multiple reference lines (MRL). The idea is to make the prediction based on several sets of reference lines as shown in FIG. 2, and then to choose the reference line giving the best rate-distortion performance. FIG. 2 shows multiple reference lines for intra prediction in VTM. The reference lines are indexed in order of their distance from the target block. The reference line closest to the target block is indexed here as 0, for example. Two other references lines used in this example for prediction are indexed 1 and 3. The reference line used is signaled to the decoder with a variable-length code. With three reference lines as in FIG. 2, which is used in VTM 4.0, the reference lines with index 0, 1 and 3 are signaled with bits "0", "10", and "11" respectively. Furthermore, to restrict the added complexity of search for the best prediction mode, the reference lines 1 and 3 are tested with only six angular prediction modes, which are derived in the same manner as the modes in the MPM list but excluding the PLANAR and DC modes. It is to be noted that the reference line 2 is not used in MRL in VTM 4.0 and is shown here only for illustrative purpose.

Figure 3:
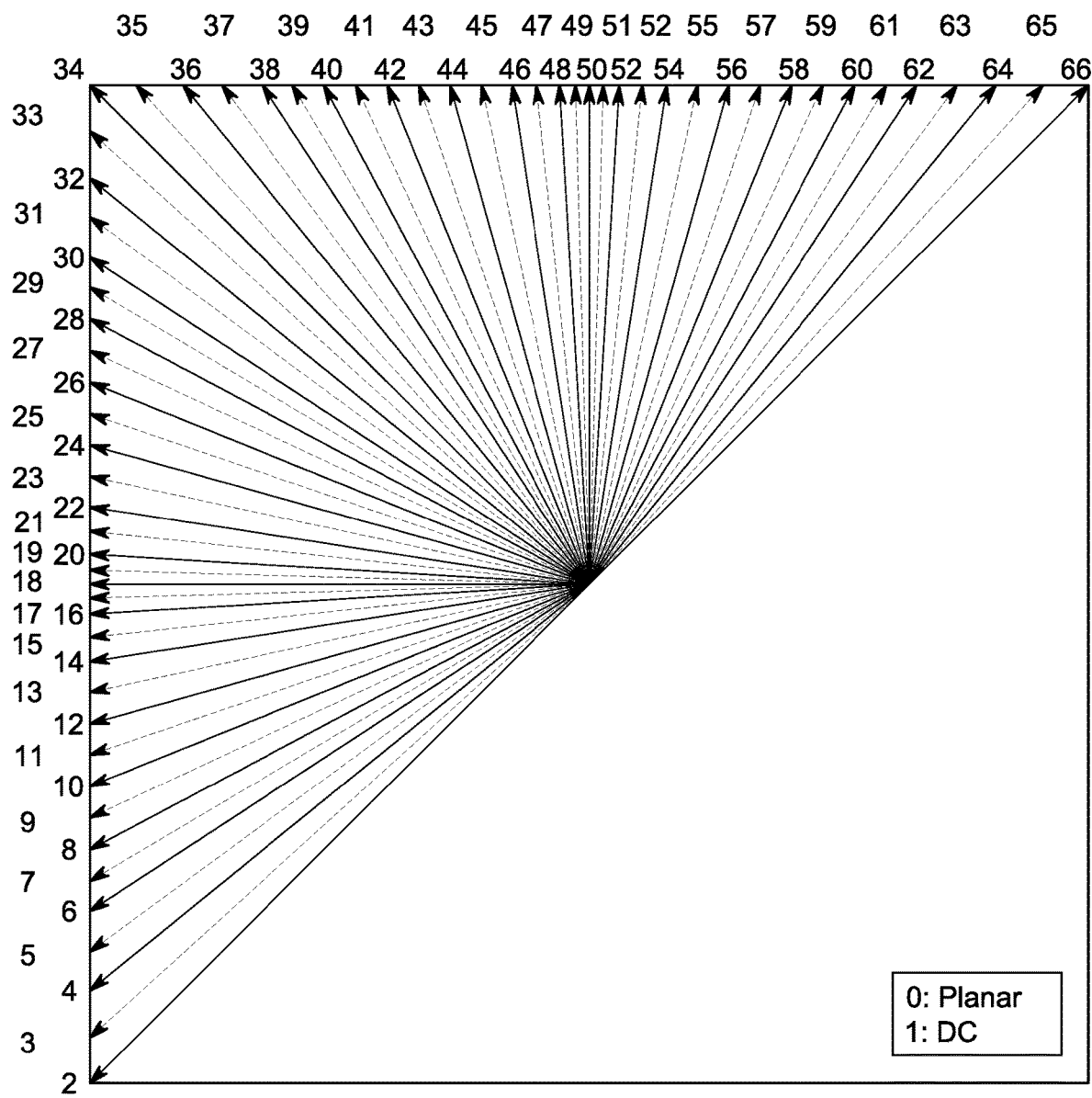
FIG. 3 shows intra prediction directions in VIM for a square target block.

The next step, i.e., the intra sample prediction, consists of predicting the pixels of the target CU based on the reference samples. As mentioned before, in order to predict different kinds of content efficiently, VTM supports a range of prediction models. Planar and DC prediction modes are used to predict smooth and gradually changing regions, whereas angular prediction modes are used to capture different directional structures. VTM supports 93 directional prediction modes which are indexed from −14 to −1 and from 2 to 80. For a square CU, only the prediction modes 2-66 are used. These prediction modes correspond to different prediction directions from 45 degree to −135 degree in clockwise direction, as illustrated in FIG. 3, which shows intra prediction directions in VTM for a square target block. The numbers denote the prediction mode index associated with the corresponding direction. Modes 2 to 33 indicate horizontal predictions and modes 34 to 66 indicate vertical predictions.

Modes with indexes from −14 to −1 and indexes from 67 to 80 are wide angular modes which are used for rectangular blocks of different shapes. Modes −14 to −1 are defined beyond mode 2 (beyond angle 45 degree) and are used for tall rectangular blocks (blocks with height greater than width). Analogously, modes 67 to 80 are defined beyond mode 66 (beyond angle −135 degree) and are used for flat rectangular blocks (blocks with width greater than height). The number of wide angular modes used for a rectangular block depends on the aspect ratio of the block. In any case, the total number of angular modes used for any block is 65 and the modes are always contiguous in direction. The angular prediction modes used for different block shapes are summarized in Table 1.

TABLE 1

Range of intra prediction modes for different target block shapes in VTM. W/H refers to the width-to-height ratio of the block.

| W/H ratio | Range of intra prediction modes | No of wide angular modes | No of regular angular modes |
|---|---|---|---|
| 1 | 2:66 | 0 | 65 |
| 2 | 8:72 | 6 | 59 |
| 4 | 12:76 | 10 | 55 |
| 8 | 14:78 | 12 | 53 |
| 16 | 16:80 | 14 | 51 |
| ½ | −6:−1.2:60 | 6 | 59 |
| ¼ | −10:−1.2:56 | 10 | 55 |
| ⅛ | −12:−1.2:54 | 12 | 53 |
| 1/16 | −14:−1.2:52 | 14 | 51 |

VTM 4.0 also supports intra prediction with sub-partitions (ISP). This tool divides luma intra-predicted blocks vertically or horizontally into 2 or 4 sub-partitions depending on the block size dimensions, as shown in Table 2.

TABLE 2

Number of sub-partitions depending on the block size

| Block Size | Number of Sub-Partitions |
|---|---|
| 4 × 4 | 1 |
| 4 × 8 and 8 × 4 | 2 |
| All other cases | 4 |

Figure 4:
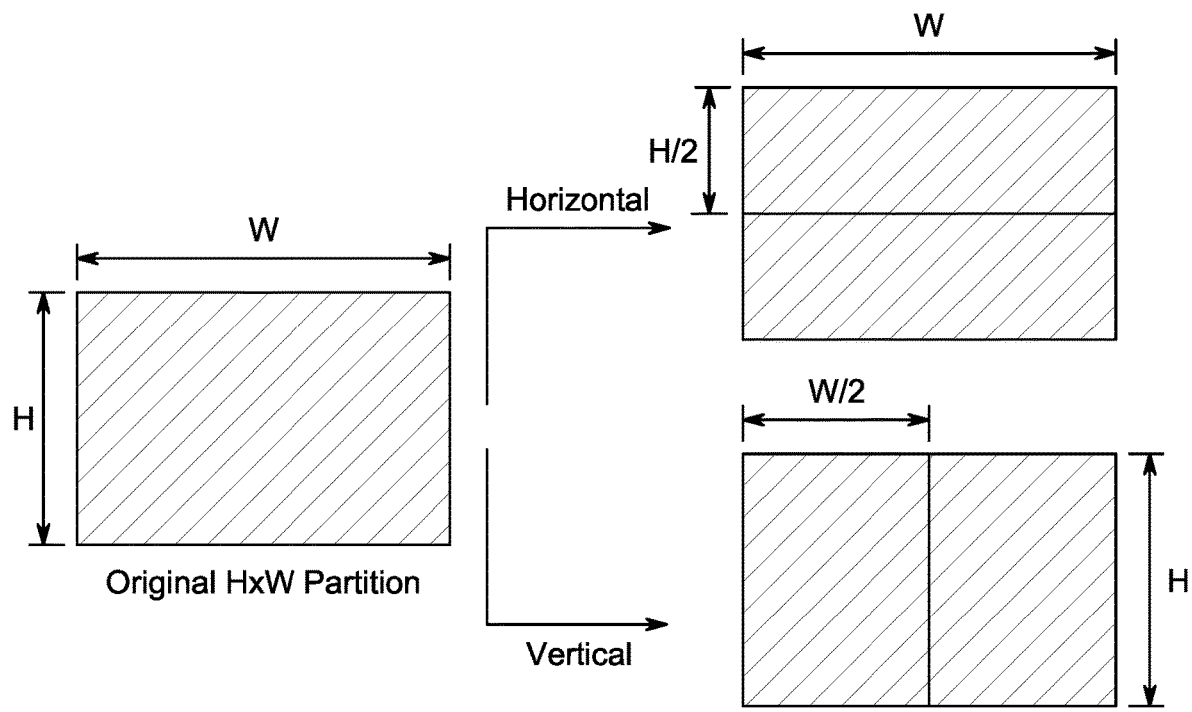
FIG. 4 shows an example of division of blocks under the general aspects described.
Figure 5:
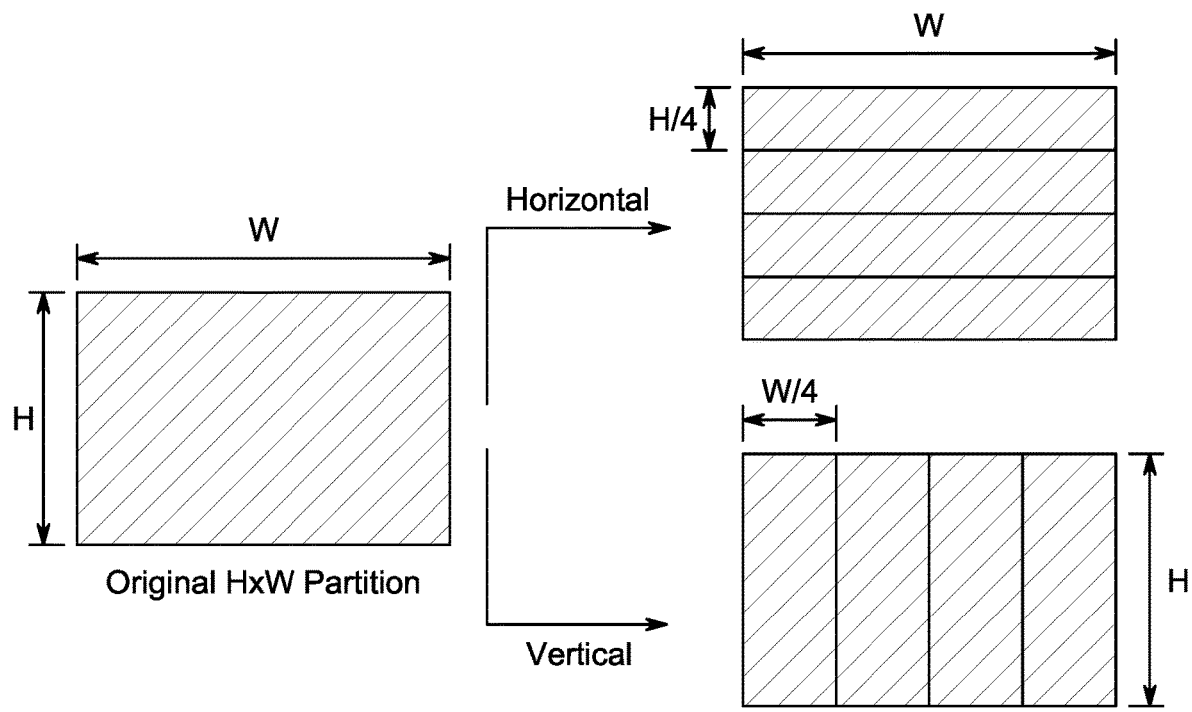
FIG. 5 shows another example of division of blocks under the general aspects described.

A sub-partition must have at least 16 pixels. Therefore, blocks of size 4×4 are not divided into sub-partitions whereas blocks of size 4×8 and 8×4 have only two sub-partitions. Blocks of all other sizes have only four sub-partitions. The sub-partitions can be either horizontal or vertical. FIG. 4 and FIG. 5 show examples of the two possibilities. FIG. 4 shows examples of division of 4×8 and 8×4 blocks. FIG. 5 shows an example of division of all blocks except 4×8, 8×4, and 4×4. The type of split is encoded as 0 (no split), or 1 (horizontal split), or 2 (vertical split).

The prediction in each sub-partition uses the prediction mode of the parent CU. The sub-partitions are processed in the normal increasing order irrespective of the intra mode and the split utilized. In VTM 4.0, ISP is applied only to the blocks employing the first reference line. Therefore, if a block has an MRL index 1 or 3, then the ISP coding mode will be inferred to be 0, and therefore is not encoded.

Furthermore, to reduce the encoding complexity, the ISP algorithm is tested with only intra modes that are part of the MPM list, which consists of six distinct modes out of 67 prediction modes. For any block tested with ISP, the MPM list is also modified to exclude the DC mode and to prioritize horizontal intra modes for the horizontal split and vertical intra modes for the vertical split.

Each coding block in Intra prediction is associated with a prediction mode. If the prediction mode is angular, all pixels in the current block are predicted in the same direction, even in the case of MRL. In the case of ISP, all sub-partitions use the same prediction mode. Using the same direction for all pixels will model straight edges, or other linear object features quite well. In order to allow non-linear features, such as a curvature, it is meaningful to consider the variation of prediction direction over a coding block.

For generality, in the following we will assume rectangular blocks having width W and height H. Square target blocks are special cases with W=H. For easier understanding, we will present the theory assuming no MRL and no ISP in the beginning. Subsequently, we will describe different embodiments where we will present different ways of combining the proposed method with MRL and ISP.

To start with the simplest case of intra prediction mode partitioning, we will consider the case of a coding block with two prediction modes. In a general setting, the two modes can be arbitrary, but our goal is to consider only the modes which are close in direction. This requirement arises from an assumption that the directionality of objects can change only a little inside a coding block, if not remaining constant. Therefore, we will consider only two adjacent prediction directions, such as V and V+1, or V and V−1, for example, where V denotes the angular prediction mode under consideration. We will assume this simple case as this will require the minimum amount of signaling, but the disclosed ideas are not limited to only two intra prediction mode partitions.

Figure 6:
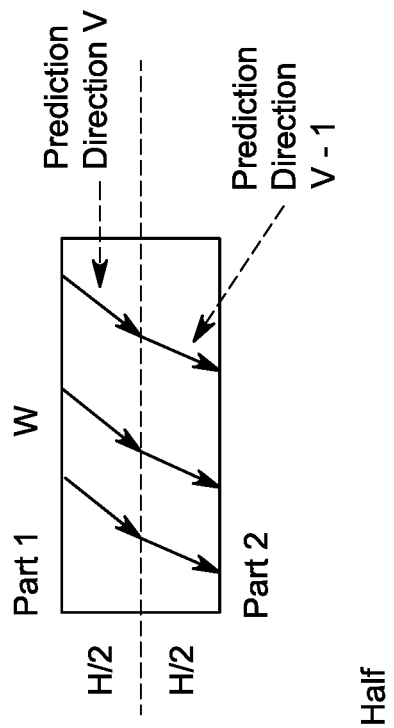
FIG. 6 shows symmetric horizontal and vertical splits into two parts under the general aspects described.
Figure 6:
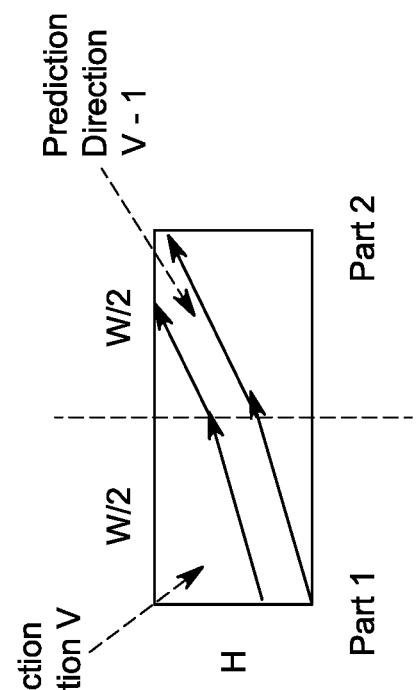
Figure 6:
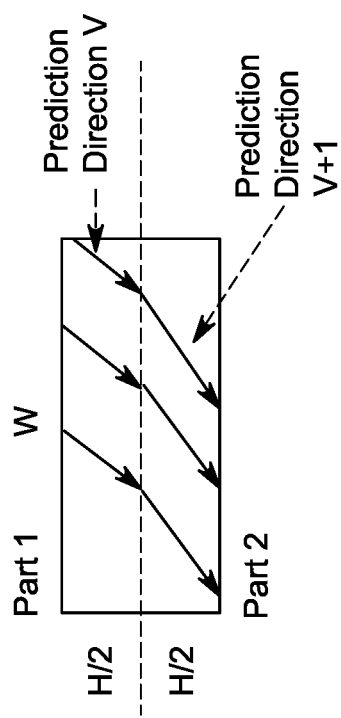
Figure 6:
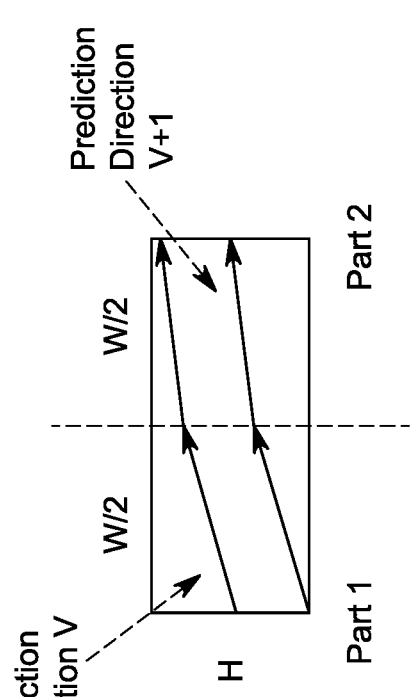
Figure 7:
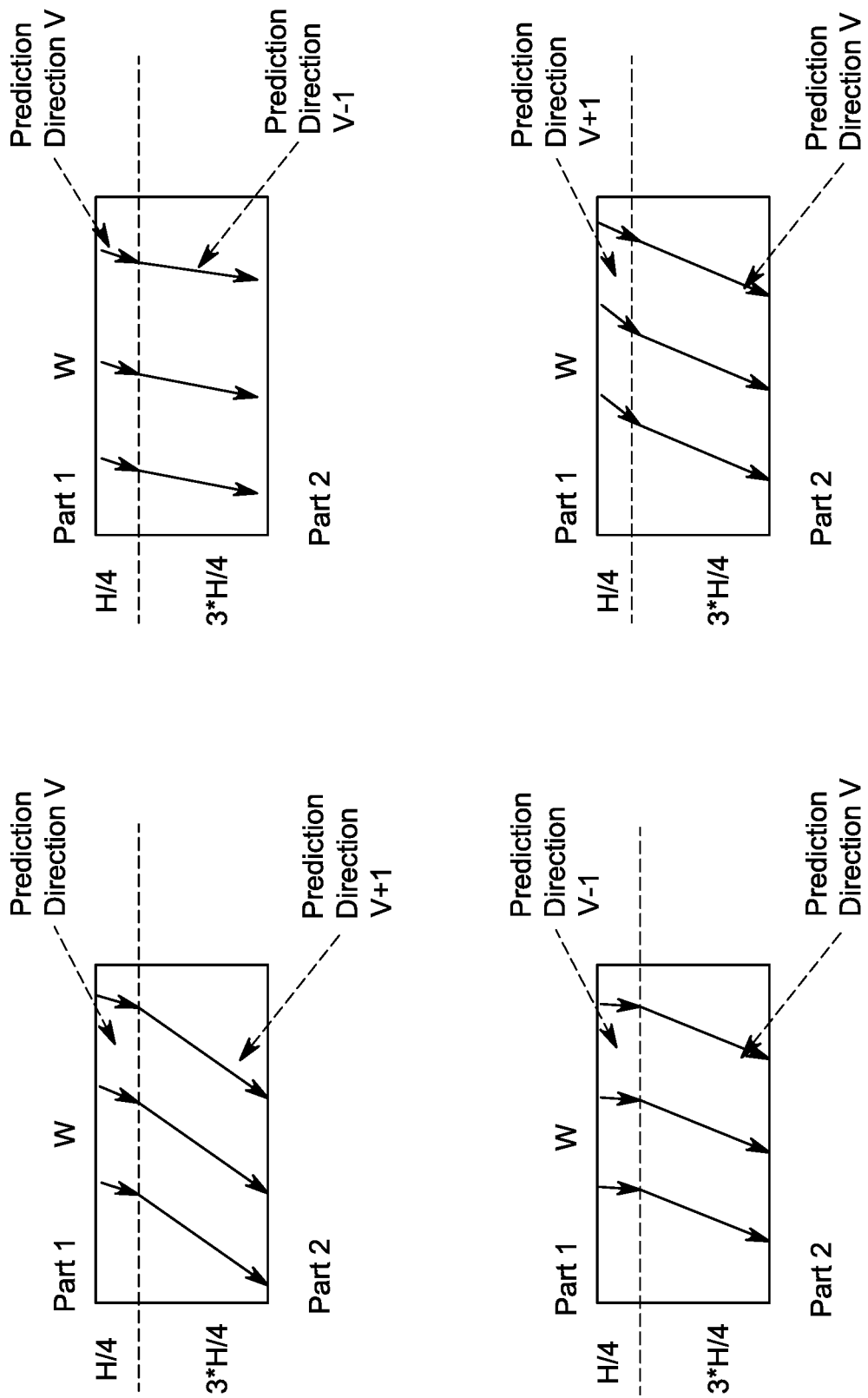
FIG. 7 shows asymmetric horizontal splits under the general aspects described.

Second, we will also assume that the two prediction modes are applied over two non-overlapping regions of the coding block. The simplest method is to split the block, either horizontally or vertically, into two parts, as the coding blocks are rectangular or square. Though the split can happen at any pixel position, and with any number of splits, we will consider only structured splits. That is, we will consider only splits at the middle (one split with equal sized parts), or at one-fourth and three-fourth of the dimension (asymmetric splits). These are shown in FIG. 6 and FIG. 7. FIG. 6 shows symmetric horizontal and vertical splits in two parts. Horizontal split is applied in the case when the prediction mode V is vertical. Vertical split is applied in the case when the prediction mode V is horizontal. In the horizontal split case (top), the top part has prediction mode V, and the bottom part has prediction mode (V−1) or (V+1). This can be reversed with the bottom part having the prediction mode V and the top part having the prediction mode either (V−1) or (V+1). An analogous situation applies to the case of vertical split. We will apply horizontal splits for vertical prediction directions and vertical splits for horizontal prediction directions, although other splits are possible under the current general aspects.

FIG. 7 shows asymmetric horizontal splits. In one case the pixels in the smaller part have prediction mode V and those in the bigger part have the prediction mode either (V−1) or (V+1) (top two figures). In another case, the pixels in the larger part have prediction mode V, and those in the smaller part have the prediction mode (V−1) or (V+1) (bottom two figures). Analogous splits can be made in a vertical direction when the prediction mode is horizontal.

Figure 8:
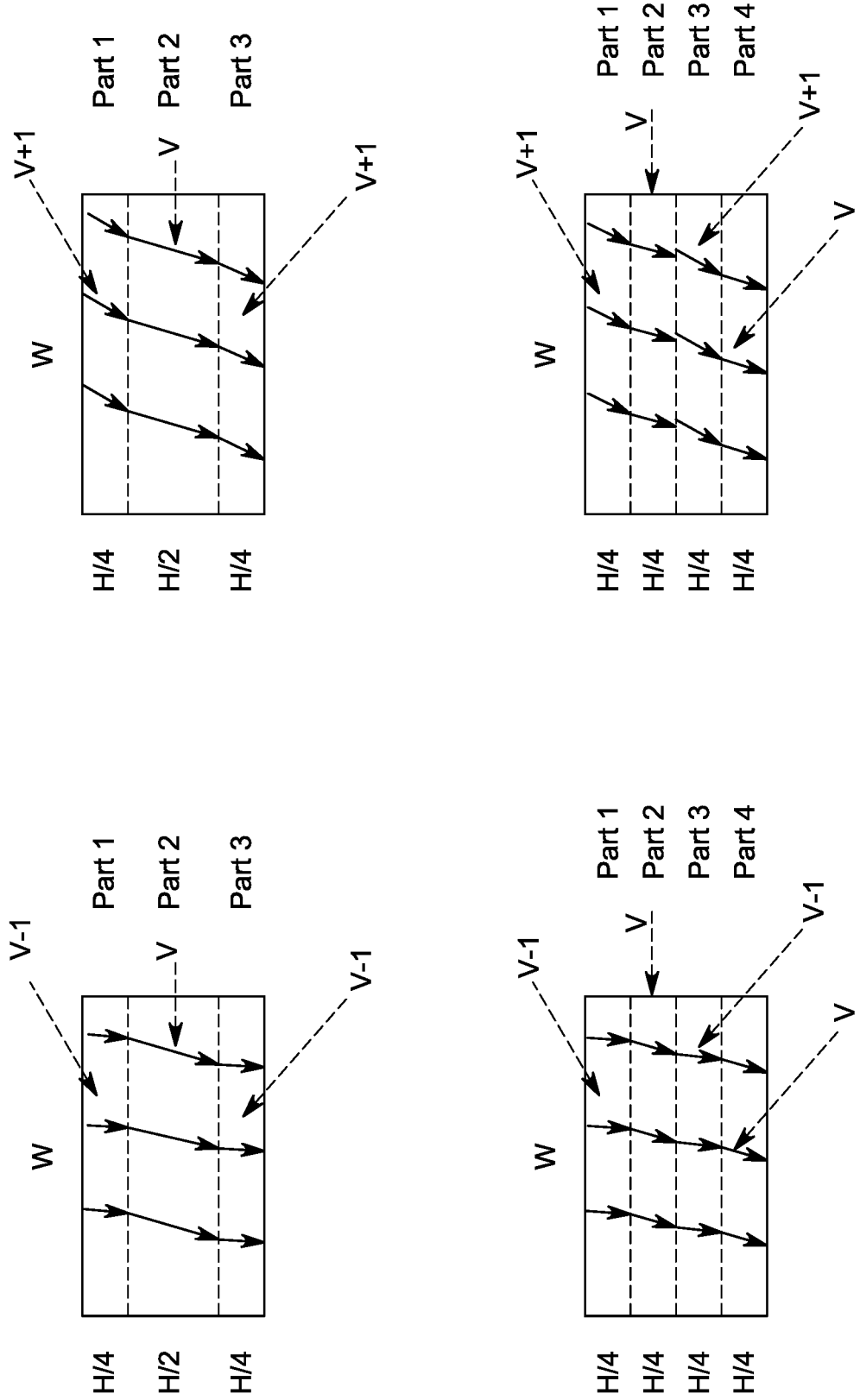
FIG. 8 shows examples of horizontal split into three or four parts with a vertical prediction mode under the general aspects described.

For two prediction modes, it is not mandatory to have only two non-overlapping parts in the coding block. We could have higher number of parts where each part can have one of the two prediction modes used. FIG. 8 illustrates the cases with three and four splits. FIG. 8 shows examples of horizontal splits into three or four parts with a vertical prediction mode. In both cases we assume maximum of two prediction modes for the block. Analogous examples can be given with vertical splits when the prediction mode is horizontal.

Figure 9:
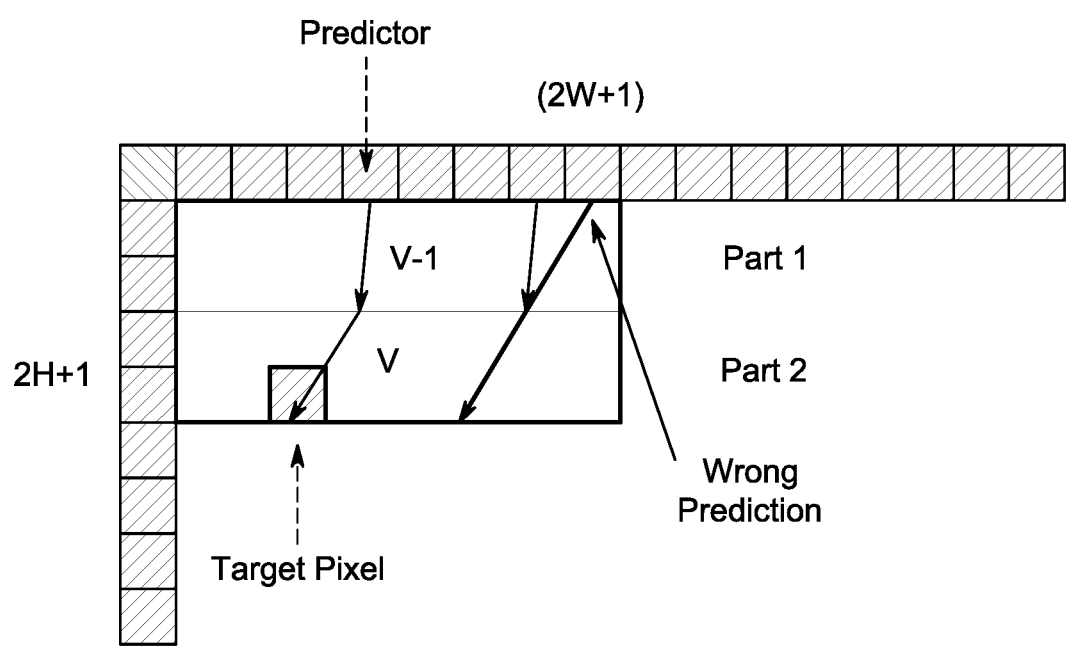
FIG. 9 shows an example of intra prediction in mode partitioning under the general aspects described.

The prediction process with mode partitioning uses the same two reference arrays, one on the top and the other on the left, of the coding block. All pixels in the current block can be predicted at the same time if the same array of reference samples are used for the whole block for the different intra prediction mode regions. This is unlike that in ISP where different partitions are processed in sequential order. With a single reference line, the prediction process is illustrated in FIG. 9. FIG. 9 shows intra prediction in mode partitioning. The target pixels in the second part are predicted by considering the prediction modes of both the first part and the second part pixels. Notice that the target pixels in the second part are not predicted directly with their prediction mode, but also by considering the prediction mode of the first part pixels. That is, the predictor for a target pixel in the second part will be determined based on both the prediction modes of the second part and the first part. In other words, when predicting the second part you still need to consider what is the prediction direction over the first part to map the proper reference sample at each pixel location. If you consider the current prediction direction, you would target a wrong position of the reference array, as depicted by the long straight arrow in FIG. 9, where the correct mapping is shown with the shorter arrows. This case also applies if we consider splits into three or four parts. The predictors for target pixels in a certain part will be determined by using the prediction modes of all previous parts along with the prediction mode of the part under consideration.

In a practical encoding scenario, the number of mode partitions will be finite. The encoder will check the rate-distortion performance of all mode partitions available and will then signal to the decoder the best mode partitioning so that the decoder knows the partitioning employed by the encoder. The higher the number of partitions, the greater the number of needed signaling bits. As described here, we will consider, but are not limited to, the case with three candidates having two partitions: (1) no partition, (2) the top (left) part having prediction mode (V−1) and the bottom (right) part having the prediction mode V when V is a vertical (horizontal) mode (3) (2) the top (left) part having prediction mode (V+1) and the bottom (right) part having the prediction mode V when V is a vertical (horizontal) mode. Alternatively, we can also consider the same splits with the modes swapped between the two parts. The three candidates can be coded with a variable-length code where no partitioning is encoded with 0, whereas the other two candidates are encoded as 10 and 11, respectively.

It is to be noted that the selection of number of partitioning and the encoding scheme can be generalized and need not be as specific as in the example above. For example, we can consider four prediction candidates, where the first prediction candidate has no split, and the remaining three candidates consider three splits of different kinds depending on the direction of the prediction mode. These four candidates can be simply encoded with a fixed length coding scheme that needs only two bits per candidate.

When the intra prediction allows multiple reference lines (MRL), as in VTM 4.0, the proposed method can be restricted to either the blocks which use the first reference line, or the blocks which use the second or the fourth reference lines, or both. Other schemes can be envisioned under the described general aspects. In the first two cases, the signaling of the mode partitioning will depend on the MRL index, and thus need not be transmitted for some blocks which do not use the particular reference line. In the last case, the signaling will be required for all blocks irrespective of the MRL index value.

Just like MRL, when the intra prediction allows ISP, as in VTM 4.0, the proposed method can be restricted to either the blocks which do not use ISP (that is, ISP index=0), or the blocks which use ISP (ISP index is non-zero), or both. In the first case, the application of the proposed method does not require any modification since the blocks are not split into sub-partitions. But, in the second case, the application of the proposed method with sub-partitions can be tricky. Since ISP allows both horizontal and vertical sub-partitions of the block without considering the directionality of the prediction mode, (which the proposed method uses), the direct application of the two modes over different sub-partitions will not work as desired. The sub-partitions in ISP need to have either one or two prediction modes depending on the directionality of the prediction mode under consideration. In the examples described herein, for simplicity, we assume that the proposed prediction method is applied to the blocks which do not use ISP (that is, blocks with ISP index=0). The second case can be considered as an extension of the described ideas.

In the following, we assume VVC Test Model VTM 4.0 codec. However, since the presented method is quite general, it can be applied in the context of any previous standards such as H.264/AVC, HEVC, etc., which use multiple directional prediction modes for intra prediction. In all Embodiments, we assume only three prediction methods with mode partitioning: (1) no split, where the same prediction mode V is used for all target pixels, (2) 2 partitions where one part's prediction mode is V and the other part's prediction mode is (V−1). (3) 2 partitions where one part's prediction mode is V and the other part's prediction mode is (V+1). In cases (2) and (3), we assume the same parts that use the prediction mode V. The splitting is horizontal when V is a vertical mode, and it is vertical when V is a horizontal mode. The partitions can be symmetric or asymmetric. The encoder checks the three prediction methods with blocks as specified in different embodiments below and selects the best method. The best prediction method is signaled with an index value equal to 0, 1, or 2, depending on the method, which is binarized and context-encoded.

Embodiment 1: In this embodiment, only the blocks which use the second or the fourth reference line are treated with the proposed prediction method. Therefore, if the current block has MRL index equal to 0, there is no encoding for mode partitioning. The decoder will assume a value of zero (no split for mode partitioning) if the decoded value of MRL index is 0. In this case, there is no conflict with ISP since ISP is applied only to the blocks having MRL index 0. Note that, MRL index is encoded before the ISP index. We propose to encode the mode partitioning index following the ISP index. The decoder thus decodes the MRL index first, then decodes the ISP index if MRL index is equal to zero or decodes the mode partitioning index otherwise.

Embodiment 2: In this embodiment, only the blocks which use the first reference line but are not split with ISP are treated with the proposed prediction method. Therefore, if the current block has MRL index equal to 1 or 3, there is no encoding for mode partitioning. There is also no encoding for mode partitioning if the MRL index is 0 but the ISP index is 1 or 2. The mode partitioning index is encoded only for the blocks having MRL index equal to zero and ISP index equal to 0. The decoder will assume a value of zero (no split for mode partitioning) if the decoded value of MRL index is non-zero, or if the decoded value of ISP index is non-zero. In this case, there is no conflict with ISP as well since there is no split of the blocks by ISP which are checked for mode partitioning. In this method, the mode partitioning index must be encoded after both the MRL index and ISP index. The decoder thus decodes both the MRL index and the ISP index before decoding the index for mode partitioning. If either MRL index or ISP index if non-zero, the mode partitioning index will be assumed to be 0 and will not be decoded.

Figure 10:
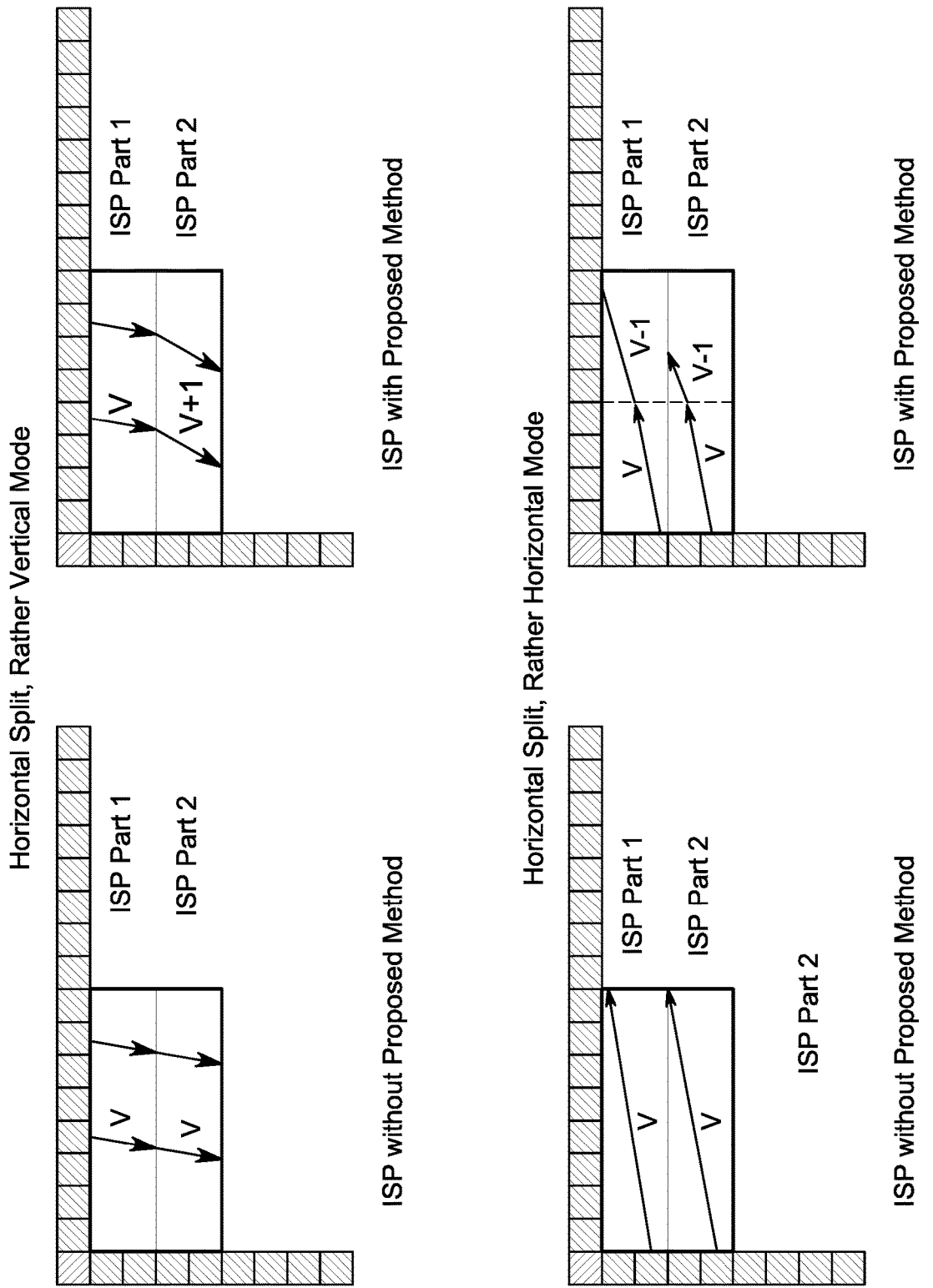
FIG. 10 shows examples of a block having a horizontal ISP partition with vertical prediction modes, and a horizontal ISP partition with horizontal prediction modes.

Embodiment 3: In this Embodiment, only the blocks which use the first reference line are treated with the proposed prediction method irrespective of the value of the ISP index. If the ISP index value is 0, then the processing is done as in Embodiment 2. Else, depending on the ISP index value, each sub-partition is treated with no mode partitioning or two mode partitions depending on the prediction direction and the type of sub-partition. For example, if the prediction mode is vertical, and the ISP partitions are horizontal, then the prediction modes of the sub-partitions are chosen from V−1 and V (or V+1 and V) depending on the mode partitioning index value. Similar case applies for vertical sub-partitions with a horizontal prediction mode. FIG. 10 illustrates one example of this case. If the block is split as per ISP and the prediction direction is consistent with the split, e.g. horizontal split and a vertical mode, keep the ISP partitions and modify the direction for the second block (+1 or −1) as in the figure.

However, if the direction is, for example, horizontal and the split is also (bottom figures below), then the proposed tool would split according to the prediction direction and one would end up with sub partitions as the bottom right drawing.

But if the sub-partitions are horizontal and the prediction mode is horizontal, or if the sub-partitions are vertical and the prediction mode is vertical, then each sub-partition can have two prediction modes as in FIG. 10.

Embodiment 4: In this Embodiment, all blocks are treated with the proposed prediction method irrespective of the values of the MRL index and ISP index. Thus, for each block, the decoder will decode the mode partitioning index.

The proposed method was implemented by incorporating it in VTM 4.0 software. The proposed prediction method was applied only to the blocks that use either the second or the fourth reference line as in Embodiment 1. That is, only the blocks with a non-zero MRL index are processed for mode partitioning. The BD-rate performance of the tested method is shown in Table 3.

TABLE 3

BD-rate performance of Embodiment 1 compared to VTM 4.0 anchor.

| | Over VTM-4.0 | | | | |
|---|---|---|---|---|---|
| | Y | U | V | EncT | DecT |
| Class A1 | 0.04% | 0.19% | −0.19% | 142% | 111% |
| Class A2 | −0.09% | −0.18% | −0.10% | 156% | 118% |
| Class B | −0.21% | −0.31% | 0.17% | 151% | 116% |
| Class C | −0.12% | −0.10% | 0.12% | 146% | 117% |
| Class E | −0.41% | −0.95% | −0.74% | 149% | 115% |
| Overall | −0.16% | −0.27% | −0.10% | 149% | 116% |
| Class D | 0.00% | −0.44% | 0.37% | 144% | #DIV/0! |
| Class F (optional) | −0.08% | −0.26% | −0.20% | 140% | 112% |

The invention aims to improve the intra prediction efficiency by allowing multiple intra prediction modes inside the same target block. The idea is to capture the real world object directionalities in target blocks. The advantage is the higher compression efficiency without much additional complexity.

Figure 11:
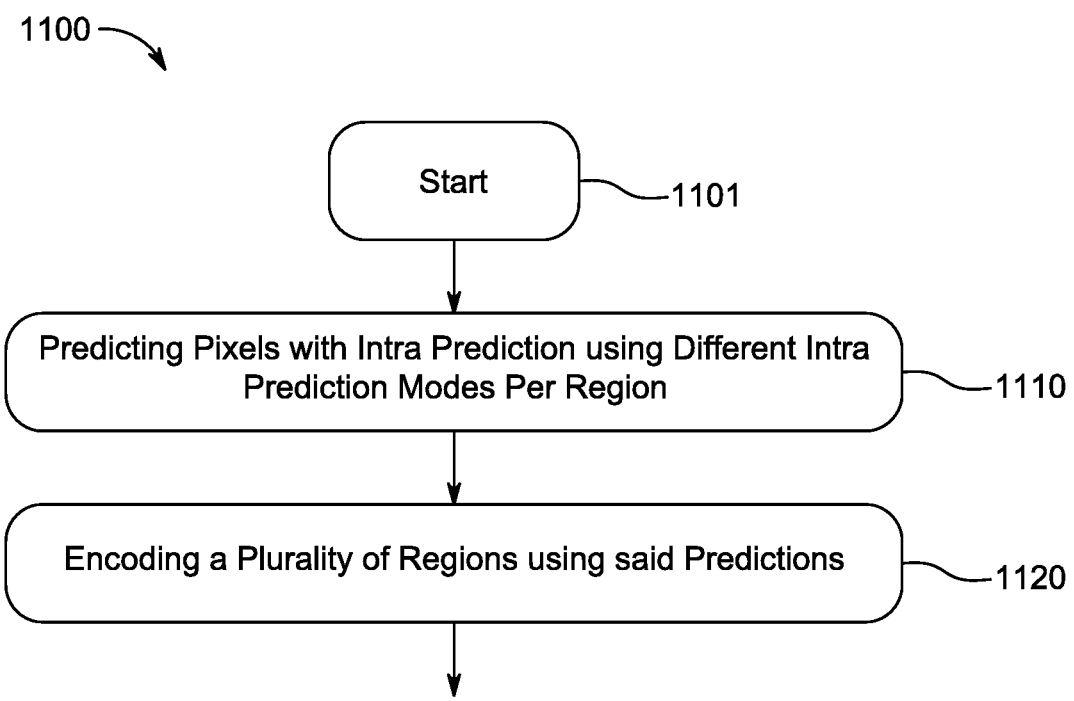
FIG. 11 shows one embodiment of an encoding method under the general aspects described.

One embodiment of a method 1100 for encoding a block of video data using the general aspects described here is shown in FIG. 11. The method commences at Start block 1101 and control proceeds to function block 1110 for predicting pixels in a plurality of regions of a block of video data with intra prediction, wherein respective regions use different intra prediction modes. Control then proceeds from block 1110 to block 1120 for encoding said plurality of regions using said predictions from the intra prediction modes.

Figure 12:
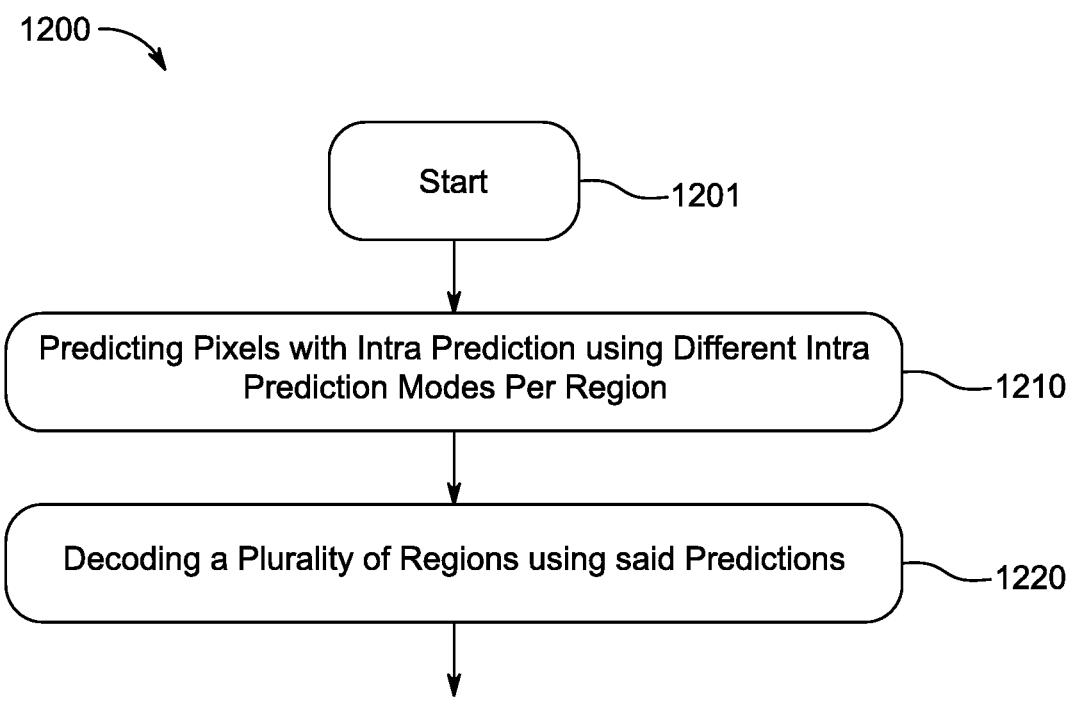
FIG. 12 shows one embodiment of a decoding method under the general aspects described.

One embodiment of a method 1200 for encoding a block of video data using the general aspects described here is shown in FIG. 12. The method commences at Start block 1201 and control proceeds to function block 1210 for predicting pixels in a plurality of regions of a block of video data with intra prediction, wherein respective regions use different intra prediction modes. Control then proceeds from block 1210 to block 1220 for decoding said plurality of regions using said predictions from the intra prediction modes.

Figure 13:
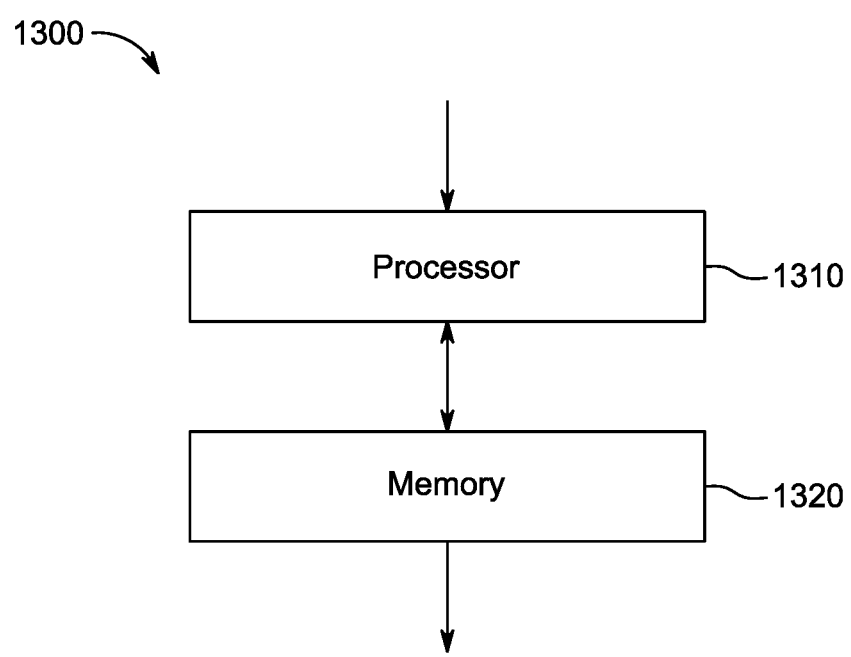
FIG. 13 shows one embodiment of an apparatus for encoding or decoding using intra prediction mode extensions.

FIG. 13 shows one embodiment of an apparatus 1300 for encoding or decoding a block of video data. The apparatus comprises Processor 1310 and can be interconnected to a memory 1320 through at least one port. Both Processor 1310 and memory 1320 can also have one or more additional interconnections to external connections.

Processor 1310 is configured to either encode or decode video data using an extended prediction mode and, either encoding or decoding the block of video data using the prediction in an extended intra coding mode.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 14:
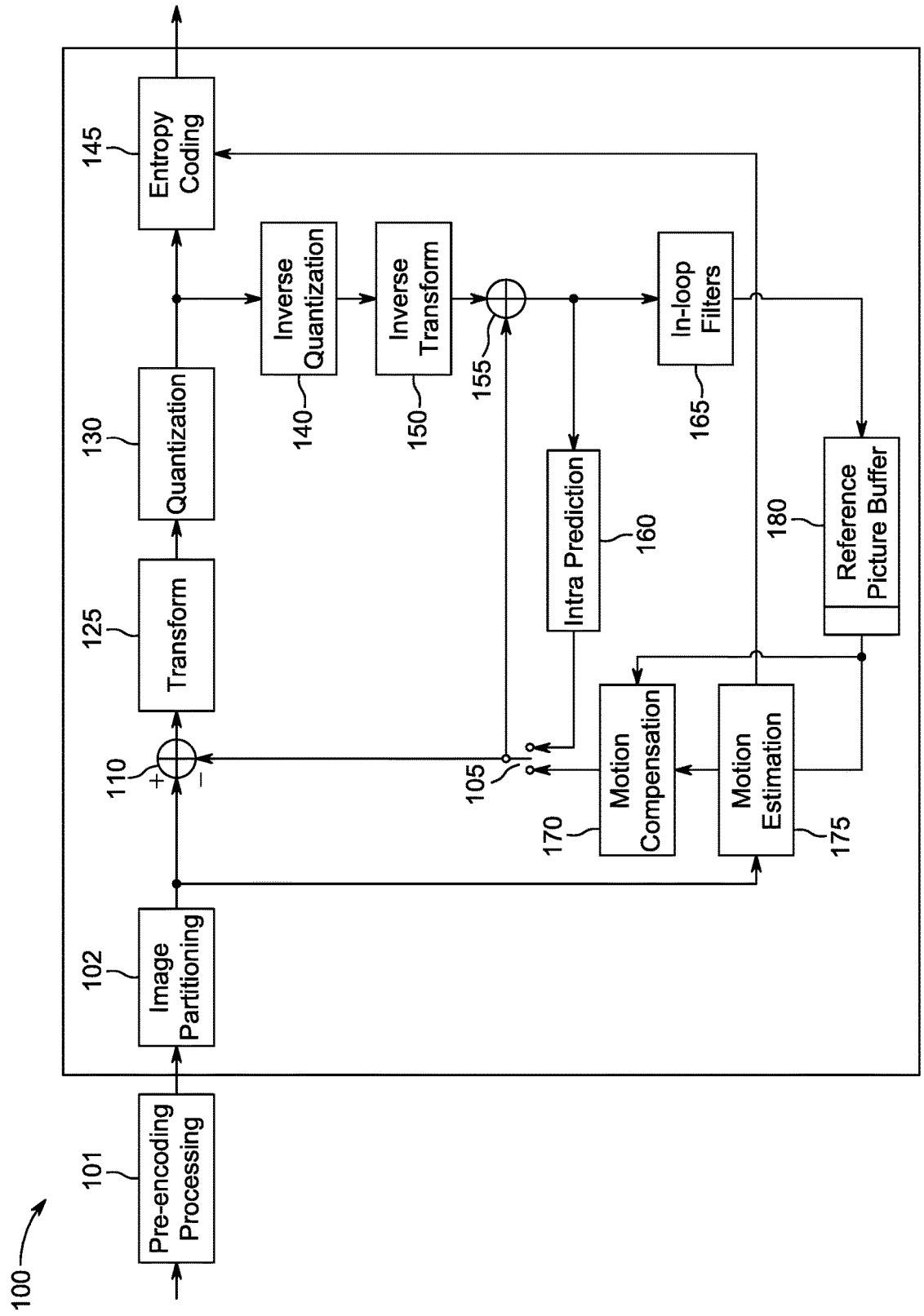
FIG. 14 shows a generic, standard encoding scheme.
Figure 15:
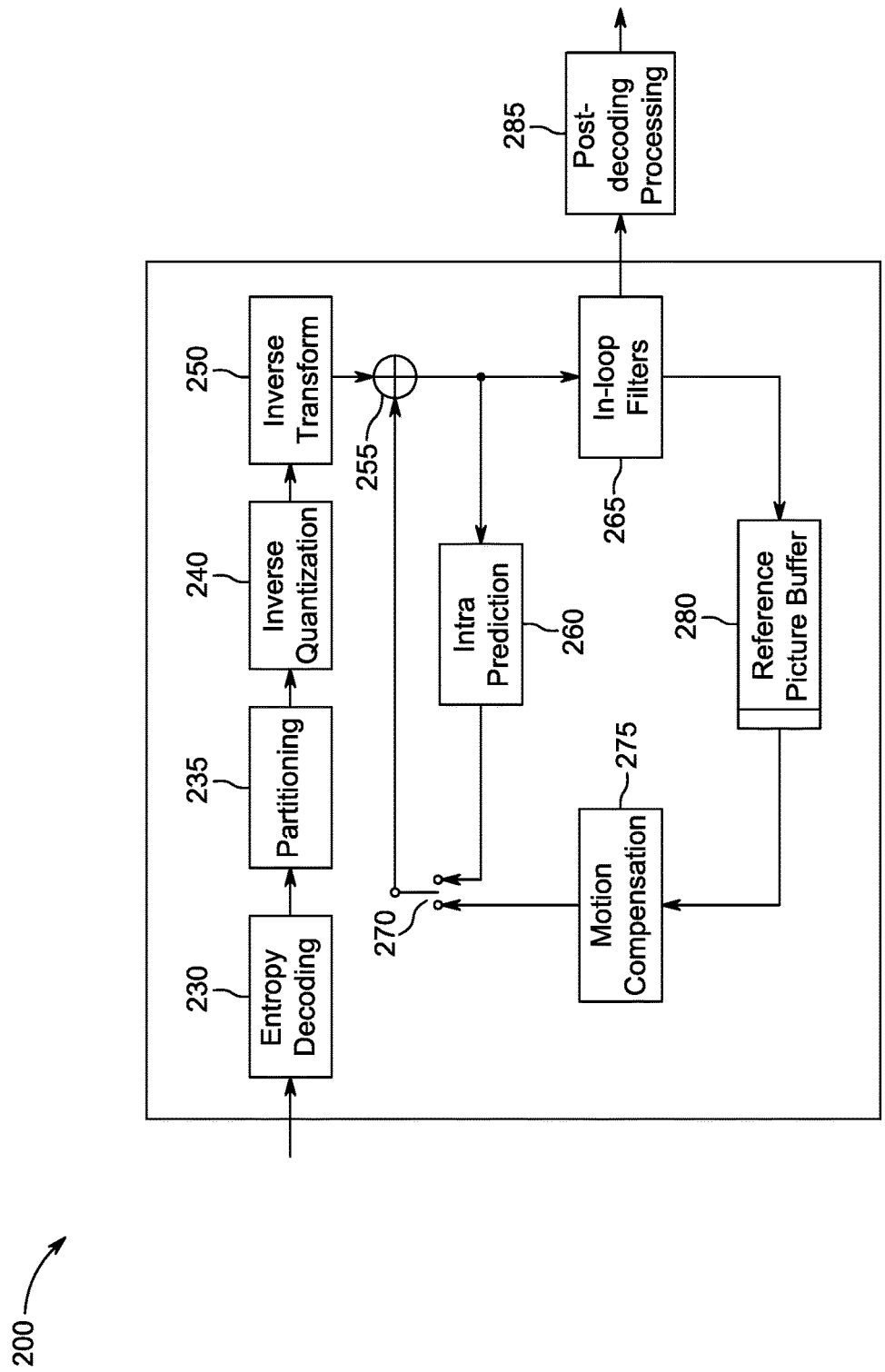
FIG. 15 shows a generic, standard decoding scheme.
Figure 16:
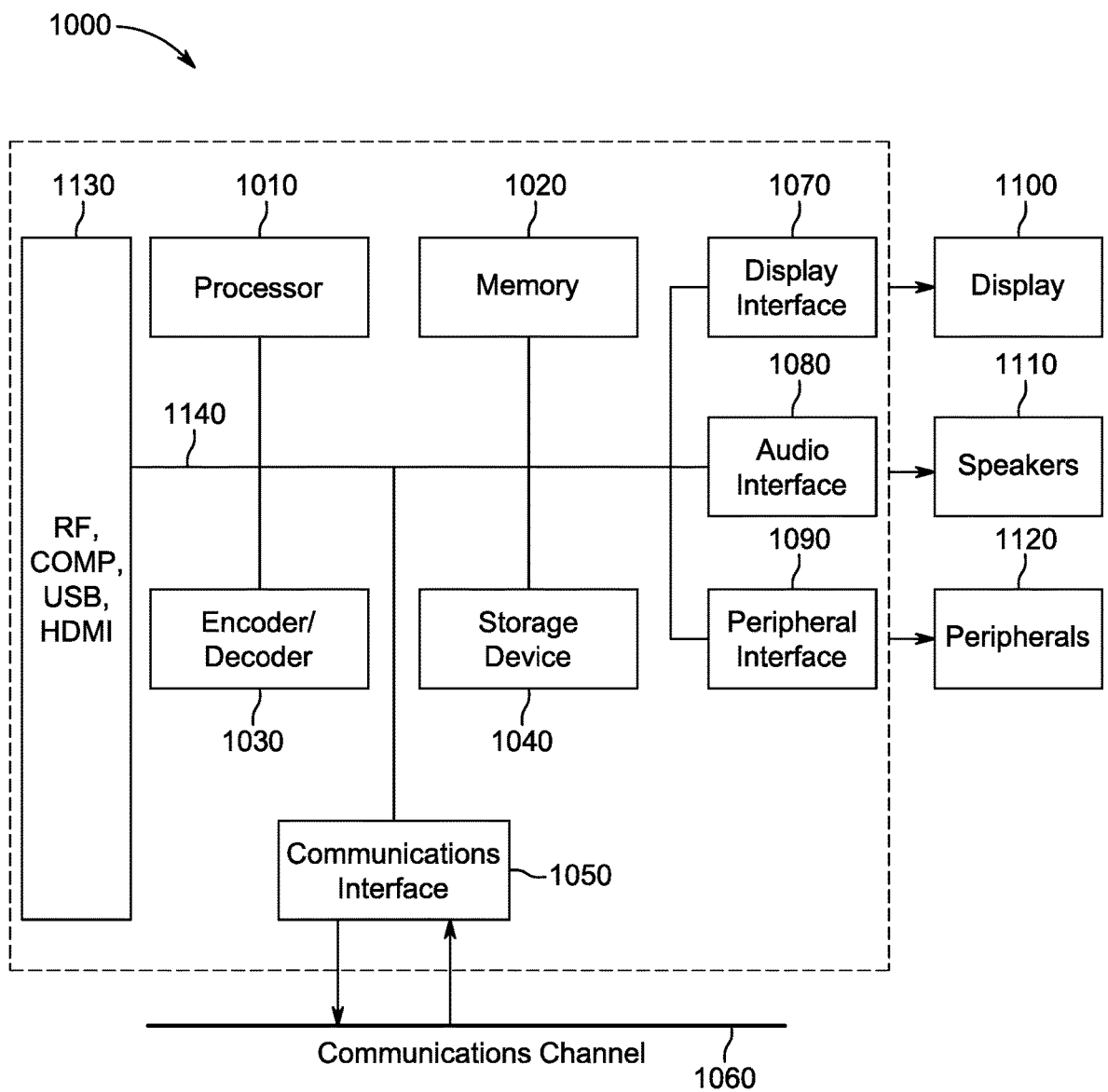
FIG. 16 shows a typical processor arrangement in which the described embodiments may be implemented.

The aspects described and contemplated in this application can be implemented in many different forms. FIGS. 14, 15, and 16 provide some embodiments, but other embodiments are contemplated and the discussion of FIGS. 14, 15, and 16 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 14 and FIG. 15. Moreover, the present aspects are not limited to WC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 14 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 15 illustrates a block diagram of a video decoder 200. In the decoder 200, a bitstream is decoded by the decoder elements as described below. Video decoder 200 generally performs a decoding pass reciprocal to the encoding pass as described in FIG. 14. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 16 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 16, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input, block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to perform intra encoding and decoding with mode partitioning.

A process or device to perform intra encoding and decoding with mode partitioning using multiple reference lines.

A process or device to perform intra encoding and decoding with mode partitioning using an MPM (Most Probable Mode) list and variable length codes to indicate which modes are used.

A process or device to perform intra encoding and decoding with mode partitioning and filtering of predicted pixels across block boundaries.

A process or device to perform intra encoding and decoding with mode partitioning on rectangular blocks.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method for encoding a block of video data, comprising:
   predicting pixels in a plurality of regions of a block of video data with intra prediction, wherein respective regions use different intra prediction modes; and
   encoding said plurality of regions using said predictions, wherein predictions are made using prediction modes of previous portion and a prediction mode of a portion under consideration, and
   wherein splitting is horizontal when one sub-partition uses a vertical prediction mode,
   and splitting is vertical when a sub-partition uses a horizontal prediction mode,
   and prediction modes for sub-partitions are adjacent prediction directions,
   and wherein a mode partitioning is signaled in a bitstream.

2. The method of claim 1, wherein an intra prediction mode of a region is determined using prediction modes of different regions of the block.

3. The method of claim 1, wherein signaling indicates a number of regions comprising the block.

4. The method of claim 1, wherein reference arrays for forming a prediction are from pixels in at least one line of pixels above the block or from at least one column of pixels left of the block.

5. A non-transitory computer readable medium containing data content generated according to the method of claim 1, for playback using a processor.

6. An apparatus, comprising:
   a processor, configured to perform:
   predicting pixels in a plurality of regions of a block of video data with intra prediction, wherein respective regions use different intra prediction modes; and
   encoding said plurality of regions using said predictions, wherein predictions are made using prediction modes of previous portions and a prediction mode of a portion under consideration, and
   wherein splitting is horizontal when one sub-partition uses a vertical prediction mode,
   and splitting is vertical when a sub-partition uses a horizontal prediction mode,
   and prediction modes for sub-partitions are adjacent prediction directions,
   and wherein a mode partitioning is signaled in a bitstream.

7. The apparatus of claim 6, wherein the plurality of regions is non-overlapping.

8. The apparatus of claim 6, wherein the processor is further configured to perform partitioning the block into the plurality of regions.

9. The apparatus of claim 6, wherein a number of regions comprising the block is signaled using syntax indicative of which lines or blocks comprise a reference array for forming a prediction.

10. The method of claim 6, wherein an intra prediction mode of a region is determined using prediction modes of different regions of the block.

11. The method of claim 6, wherein reference arrays for forming a prediction are from pixels in at least one line of pixels above the block or from at least one column of pixels left of the block.

12. A method for decoding a block of video data, comprising:
   predicting pixels in a plurality of regions of a block of video data with intra prediction, wherein respective region use different intra prediction modes; and,
   decoding said plurality of regions using said predictions, wherein predictions are made using prediction modes of previous portions and a prediction mode of a portion under consideration, and
   wherein splitting is horizontal when one sub-partition uses a vertical prediction mode,
   and splitting is vertical when a sub-partition use a horizontal prediction mode,
   and prediction modes for sub-partitions are adjacent prediction directions,
   and wherein a mode partitioning is determined from a bitstream.

13. An apparatus, comprising:
   a processor, configured to perform:
   predicting pixels in a plurality of regions of a block of video data with intra prediction, wherein respective regions use different intra prediction modes; and,
   decoding said plurality of regions using said predictions, wherein predictions are made using prediction modes of previous portions and a prediction mode of a portion under consideration, and
   wherein splitting is horizontal when one sub-partition uses a vertical prediction mode, and splitting is vertical when a sub-partition uses a horizontal prediction mode, and prediction modes for sub-partitions are adjacent prediction directions, and wherein a mode partitioning is determined from a bitstream.

14. A device comprising:
an apparatus according to claim 13; and
at least one of (i) an antenna configured to receive a signal, the signal including the video block, (ii) a band limiter configured to limit the received signal to a band of frequencies that includes the video block, and (iii) a display configured to display an output representative of a video block.

15. The apparatus of claim 13, wherein the processor is further configured to perform partitioning the block into the plurality of regions.

16. The apparatus of claim 13, wherein a number of regions comprising the block is signaled using syntax indicative of which lines or blocks comprise a reference array for forming a prediction.

17. A non-transitory computer program product comprising instructions which, when the program is executed by a computer, cause the computer to perform:

predicting pixels in a plurality of regions of a block of video data with intra prediction, wherein respective regions use different intra prediction modes; and, decoding said plurality of regions using said predictions, wherein predictions are made using prediction modes of previous portions and a prediction mode of a portion under consideration, and wherein splitting is horizontal when one sub-partition uses a vertical prediction mode, and splitting is vertical when a sub-partition uses a horizontal prediction mode, and prediction modes for sub-partitions are adjacent prediction directions, and wherein a mode partitioning is determined from a bitstream.

* * * * *